J. McCONNELL.
FLUID PRESSURE MOTOR.
APPLICATION FILED JAN. 10, 1910.

1,013,885.

Patented Jan. 9, 1912.
7 SHEETS—SHEET 3.

WITNESSES:
J. Herbert Bradley.
Theodore Duff.

INVENTOR
Jacob McConnell
by Christy and Christy
Attys

J. McCONNELL.
FLUID PRESSURE MOTOR.
APPLICATION FILED JAN. 10, 1910.

1,013,885.

Patented Jan. 9, 1912.

7 SHEETS—SHEET 7.

WITNESSES:
J. Herbert Bradley
Theodore Duff

INVENTOR
Joseph McConnell
by Chitty and Chitty
Atty's

UNITED STATES PATENT OFFICE.

JOSEPH McCONNELL, OF CONNELLSVILLE, PENNSYLVANIA.

FLUID-PRESSURE MOTOR.

1,013,885.   Specification of Letters Patent.   Patented Jan. 9, 1912.

Application filed January 10, 1910. Serial No. 537,295.

*To all whom it may concern:*

Be it known that I, JOSEPH MCCONNELL, residing at Connellsville, in the county of Fayette and State of Pennsylvania, a citizen of the United States, have invented or discovered certain new and useful Improvements in Fluid-Pressure Motors, of which improvements the following is a specification.

The invention described herein relates to certain improvements in internal combustion motors of the rotary type, and has for its object a construction wherein the combustible gases are compressed in one or more portions of the cylinder and exploded in another portion, the exploded gases operating on the head which has previously effected the compression.

The invention is hereinafter more fully described and claimed.

Figure 1:
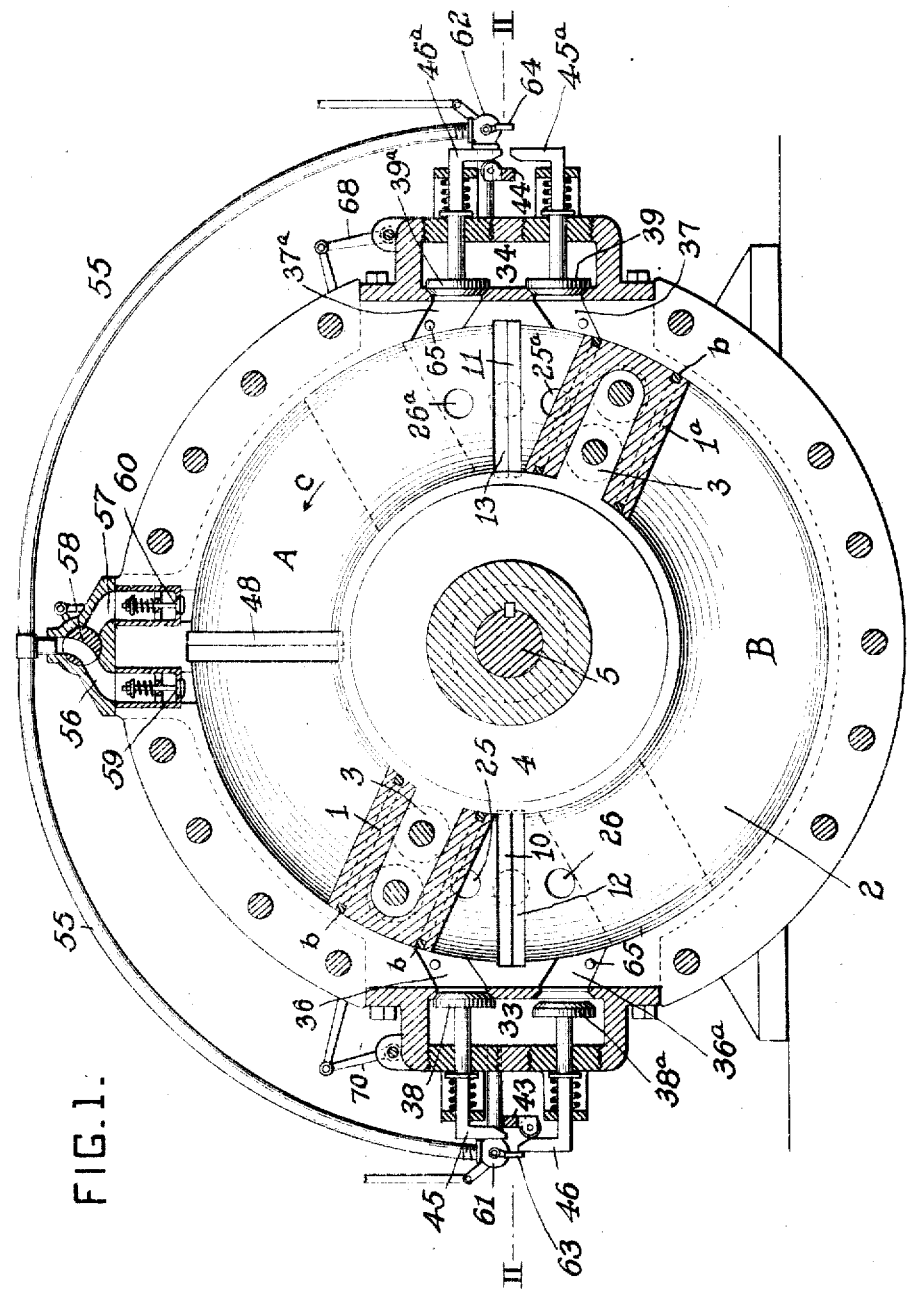
Figure 2:
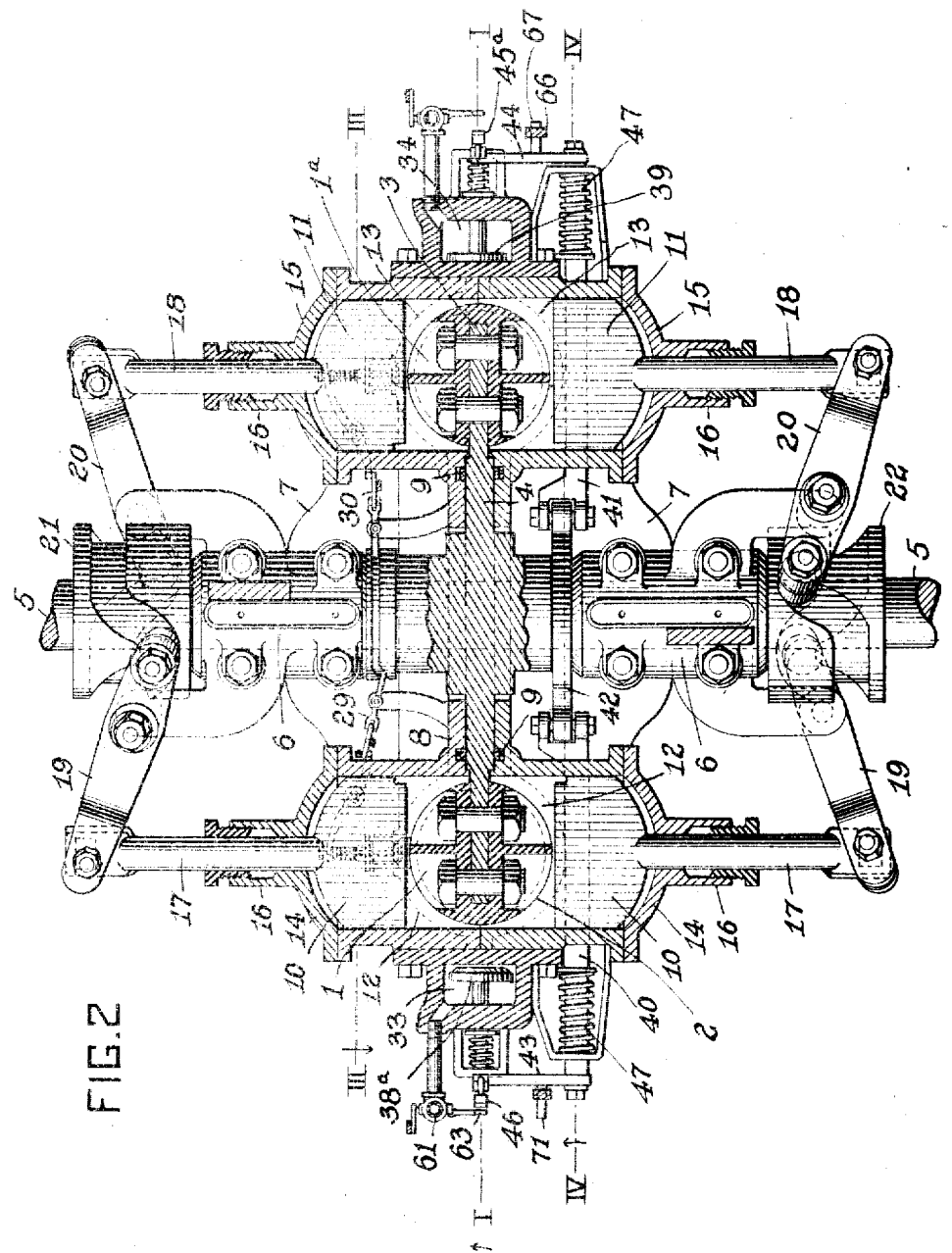
Figure 3:
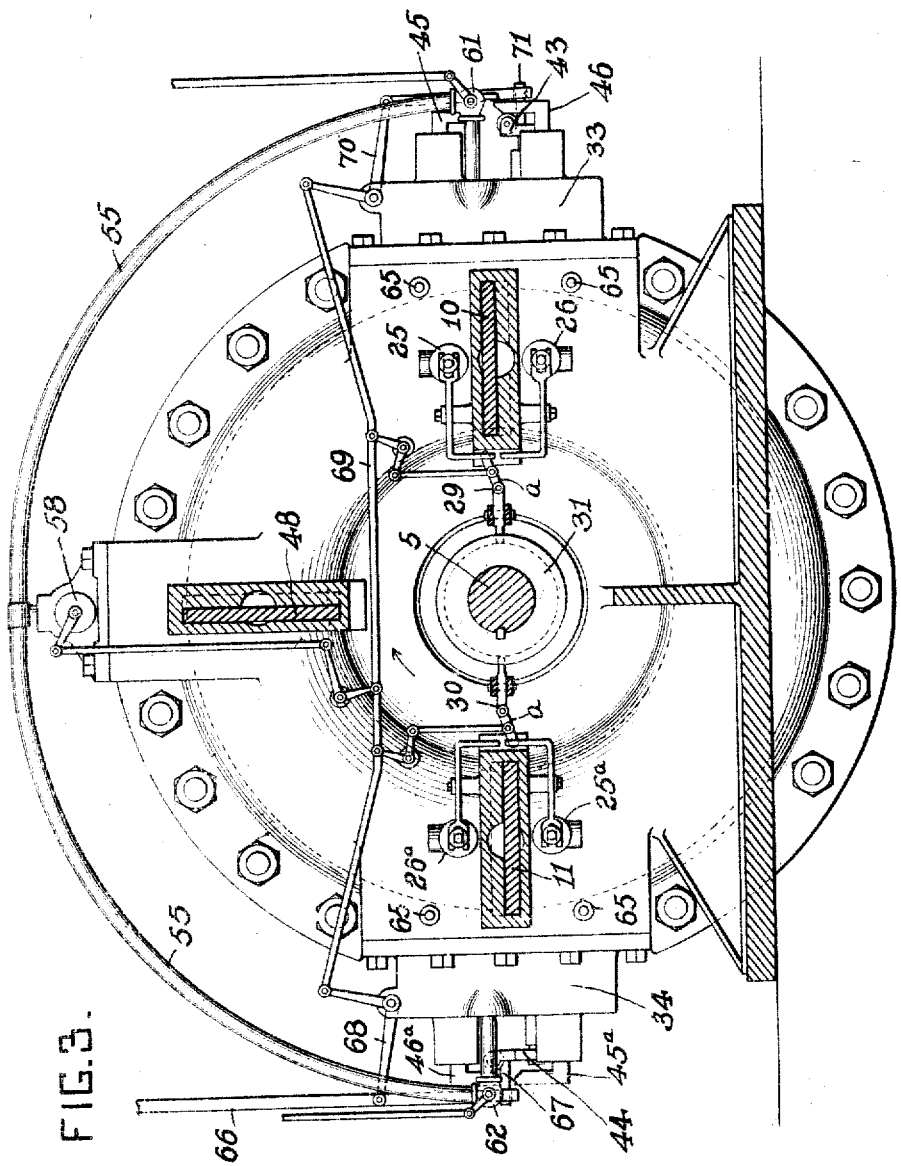
Figure 4:
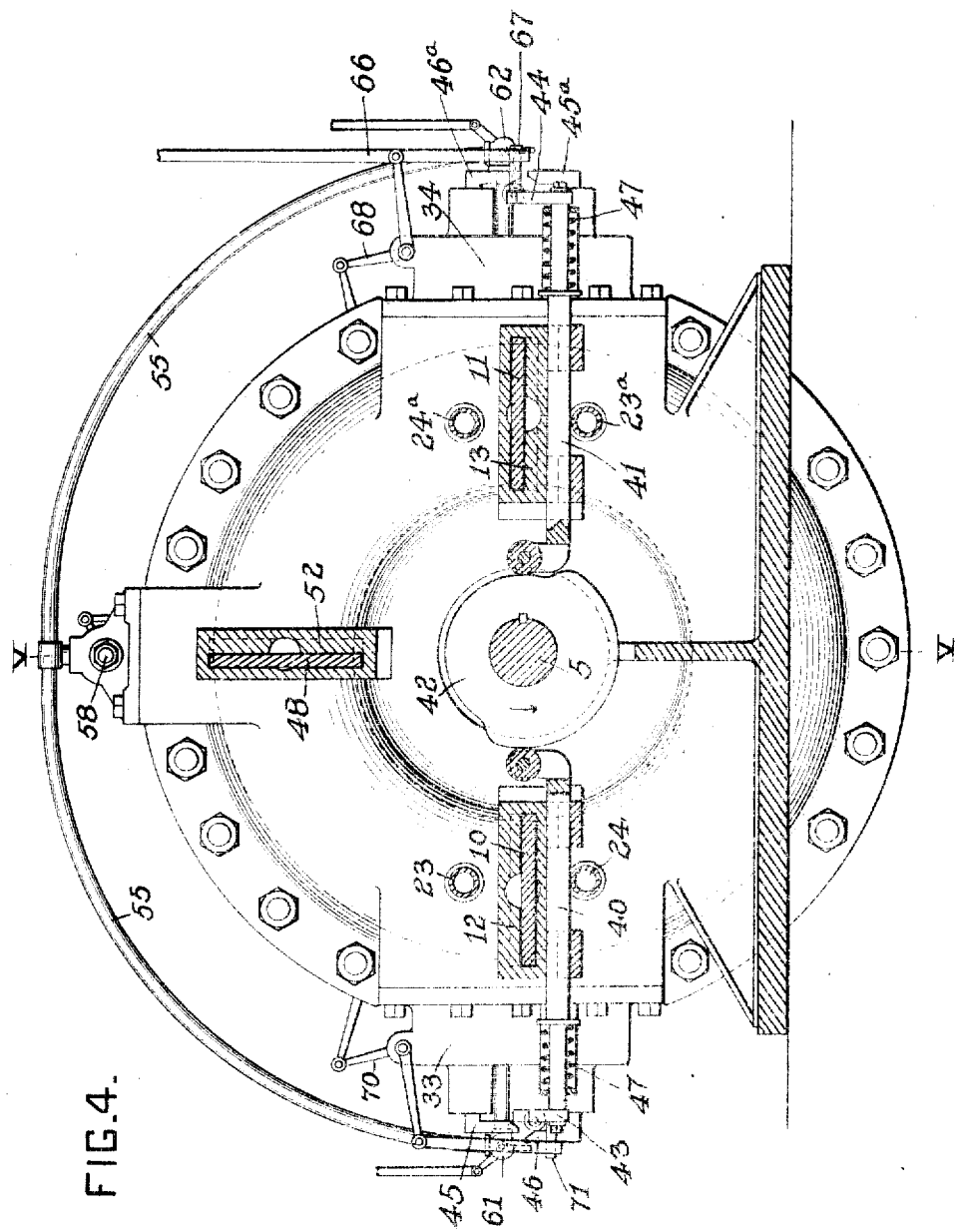
Figure 5:
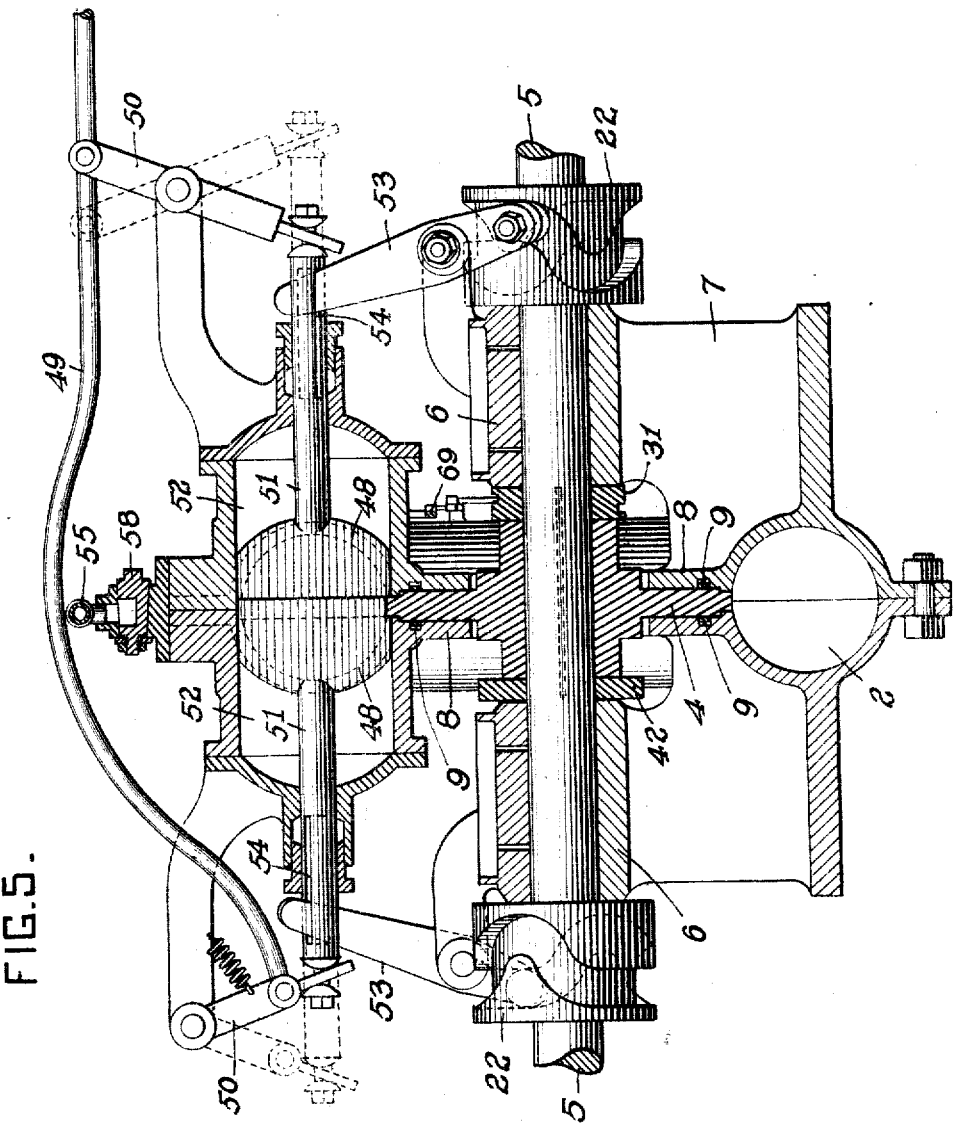
Figure 6:
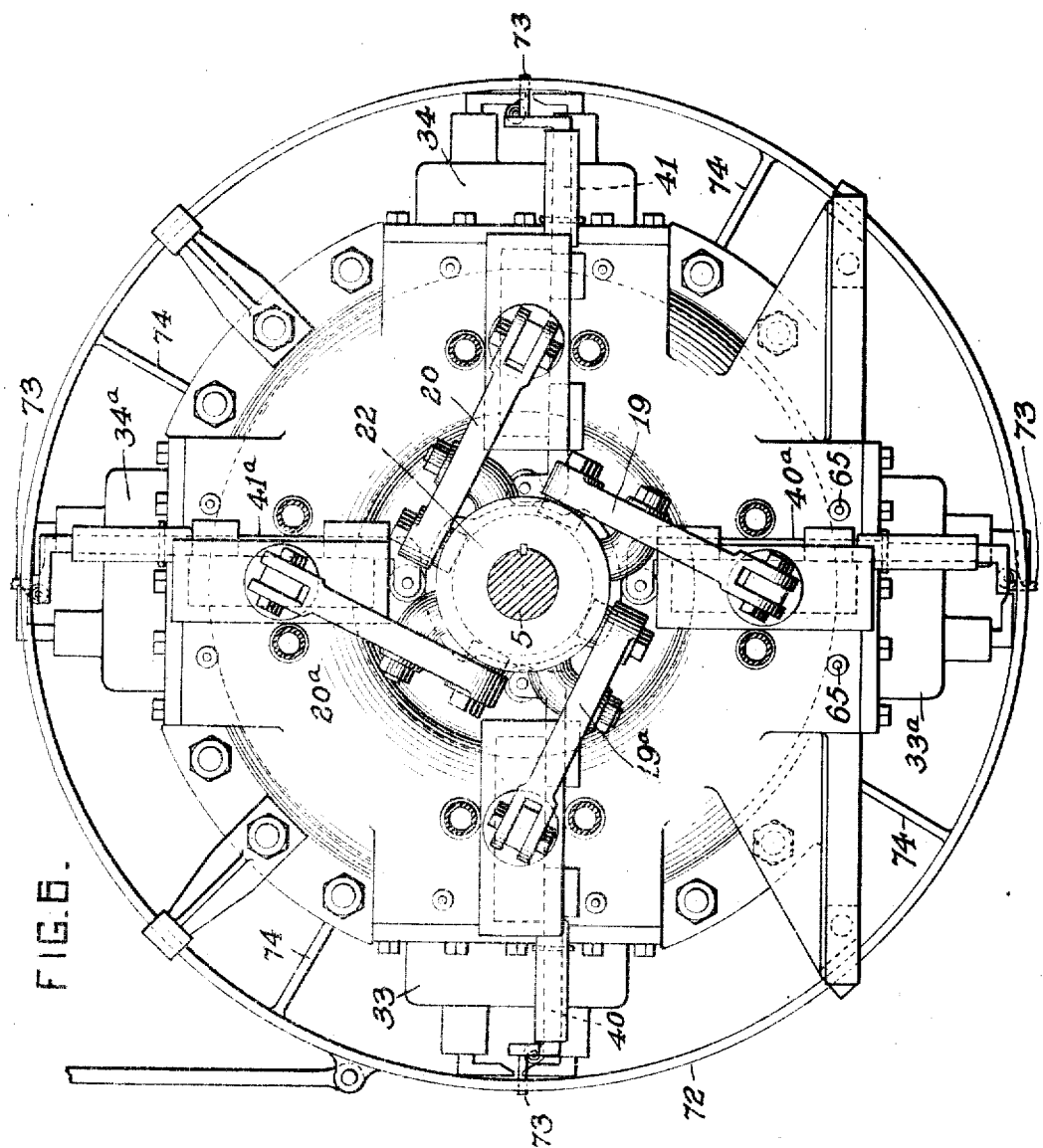
Figure 7:
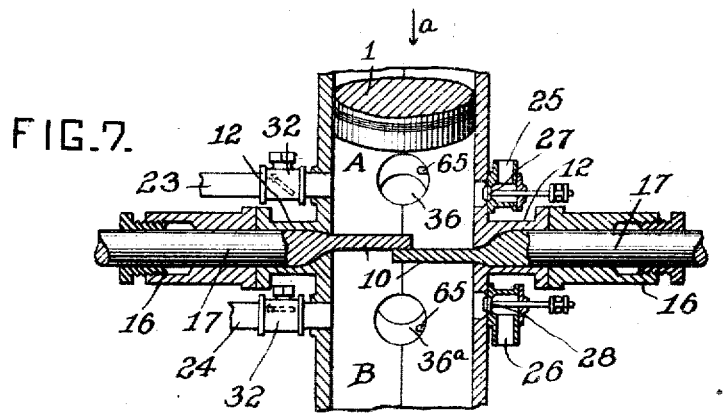
Figure 8:
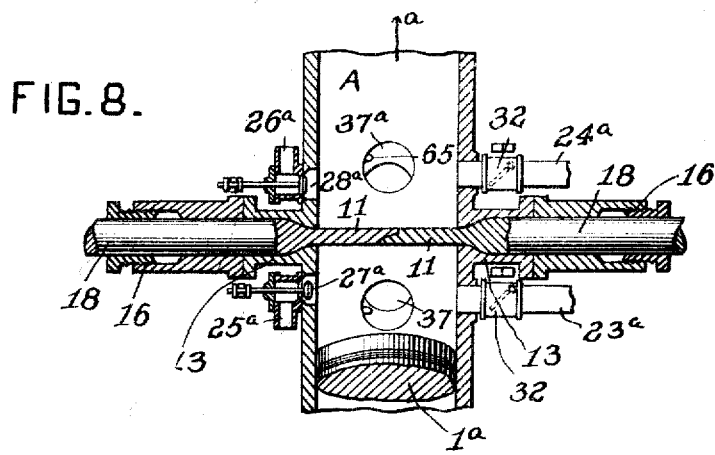
Figure 9:
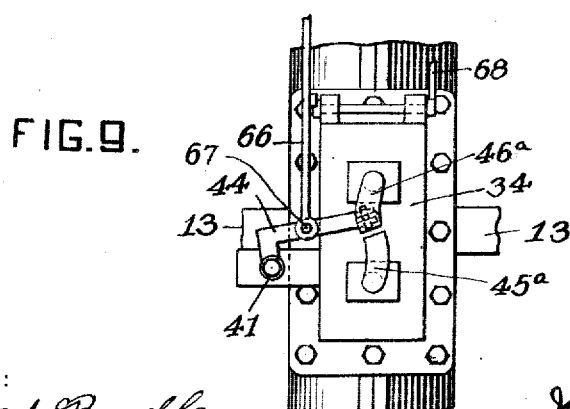

In the accompanying drawings forming a part of this specification Figure 1 is a sectional elevation of the motor, the plane of section being indicated by the line I—I, Fig. 2; Fig. 2 is a sectional elevation in a plane indicated by the line II—II Fig. 1; Fig. 3 is a sectional elevation on a plane indicated by the line III—III, Fig. 2, looking in the direction indicated by an arrow *x*; Fig. 4 is a similar view on a plane indicated by the line IV—IV, Fig 2, looking in the direction indicated by an arrow; Fig. 5 is a sectional elevation on a plane indicated by the line V—V Fig. 4; Fig. 6 is an end elevation, showing mechanism for operating dividing doors of a motor wherein four or more explosions per revolution are obtained; Figs. 7 and 8 are sectional detail views showing the positions of a head at the end of a compressing movement and at the time explosion occurs, and Fig. 9 is a detail view of the valve operating mechanism.

In the practice of my invention, the heads 1, 1ˣ, are arranged to traverse an annular chamber 2 which is preferably circular in cross-section. The heads which correspond transversely to the contour of the annular working chamber and are curved longitudinally to the peripheral curvature of the chamber, are secured to spokes 3 projecting radially from the central web or disk 4 of the rotary member. This member is keyed to a shaft 5 which is mounted in bearings 6, preferably formed integral with the castings 7. These castings 7 have annular recesses formed in their inner faces, said recesses being so constructed as to form, when the castings are bolted together, the working chamber 2. These castings have flanges 8 projecting inwardly from the walls of the working chamber, adapted when the castings are bolted together to inclose the outer portion of the web or disk 4, between which and the flanges tight joints are formed by packing rings 9.

In the construction shown in Figs. 1 to 5 the working chamber or cylinder is divided into two sections or working portions in each of which is successively effected scavenging, feeding in of gas, compression, and combustion. The division of the cylinder into sections is effected by walls or abutments, which are preferably formed in sections 10 and 11, whereby movement of each abutment section through a distance less than the diameter of the chamber is sufficient to remove each abutment out of the path of the heads or to restore it to normal position across the chamber. The walls or abutments are made of such dimensions that, when in position across the working chamber or cylinder, the outer portions will be supported and held rigid by the side walls of the grooves or pockets 12 and 13 in which the abutments are arranged. These pockets project laterally from the sides of the cylinder or working chamber, and preferably formed integral therewith. The outer ends of the pockets are closed by caps 14 and 15, provided with stuffing boxes 16, through which extend the stems 17 and 18 of the wall or abutment sections. While these wall sections may be shifted in and out by any suitable means, this may be conveniently effected by the construction shown, consisting of levers 19 and 20, connected at their outer ends to the stems 17 and 18, while their inner ends project into cam grooves in the peripheries of drums 21 and 22 carried on the shaft 5. The pockets and grooves in which the wall sections are mounted may be so arranged that the inner ends of each pair of sections will overlap one another slightly when in operative position across the working chamber or cylinder, as shown in Figs. 1 and 7, or they may be arranged in line with each other, as shown in Fig. 8, so that the inner ends will abut one against the other. In the latter case, it is preferred that the inner ends of the sections be so shaped as not only to abut, as stated, but also to overlap, so as to insure tight joints. In order that the packing rings *b* in the heads 1 1ᵃ may not catch in the grooves in which the abutment sections move, the rings are so arranged that as the heads 1 1ᵃ travel across said grooves the said rings will be angularly disposed with respect to said grooves and each ring will progressively "shear" over each groove.

As shown in Figs. 7, and 8, each section of the cylinder is provided with an inlet port 24, 24ᵃ, and an outlet port 25ᵃ, 25, located respectively at the front and rear ends of the section. The exhaust ports 25ᵃ and 25 are provided with valves 27ᵃ and 27, seating outwardly, and operated by any suitable mechanism, such as that shown, consisting of a system of connected levers 29 and 30 (see Figs. 2 and 3) attached at one end to the stems of the valves 27ᵃ and 27, while the opposite ends engage a cam groove in the disk 31 on the shaft 5. While the flow of the explosive mixture may be controlled if desired, the suction exerted by the movement of the heads will generally be sufficient to insure a proper supply of the explosive mixture, if the inlet ports have free communication with the carbureter or other source of supply, and it will be necessary only to provide check valves 32, to prevent an outward flow of the gases, when ignited, through the inlet ports.

Compression chambers 33 and 34 are provided, adjacent to each of the dividing walls or abutments 10 and 11, and into these chambers the explosive mixture is forced and compressed by the heads in the working chamber or cylinder 2. As such heads approach the abutments, these compression chambers 33 and 34 are connected by ports 36 and 37 (see Fig. 1) with the portions of the working chamber in which the inflowing gases are being compressed by the advancing heads, 1, 1ᵃ. The ports 36, 37 are controlled by valves 38 and 39, adapted to be seated against pressure in working chamber by suitable springs. Such construction of valves permits the explosive mixture to flow into the chambers 33, 34 where it is held until the valves 38ᵃ, 39ᵃ are opened, as hereinafter described, to permit the explosive mixture to flow into the working chambers in advance of abutments 10 and 11. The opening of the valves 38ᵃ, 39ᵃ, to permit such flow of the explosive mixture into the working chamber, is effected by lifting rods 40 and 41 (see Fig. 4), mounted in suitable guides, and adapted to be shifted outwardly to lift the valves, by a cam 42 on the shaft 5. At their outer ends, the rods 40 and 41 are provided with movable tappets 43 and 44, each adapted to be moved under either one of arms 45 or 46 in the one case, 45ᵃ or 46ᵃ in the other, on the outer ends of the stems of the valves 38, 38ᵃ and 39, 39ᵃ, controlling communication between the compression chambers and the working chamber. The rods 40 and 41 are held in contact with the cam by springs 47.

As the motor may stop at a point midway, or approximately midway, between the dividing walls or abutments, in which position of the parts explosive mixture under suitable pressure, cannot be conveniently introduced, provision is made for a further subdivision of the cylinder into working sections by a sectional wall or abutment 48, arranged approximately midway between the abutments 10 and 11, as shown in Figs. 1, 3, 4, and 5. The abutment sections 48 are substantially similar in construction and mounting to those of abutments 10 and 11. Provision is made for shifting these abutment sections 48 to closed position by a manually operated lever connected to a rod 49 (see Fig. 5). The rod 49 is properly connected to pivotally mounted arms 50, so as to swing said arms in opposite directions, and at the same time correspondingly shift the abutment sections 48, the arms being in engagement with the stems 51 of the abutment sections. When necessary for starting the motor, the abutment sections 48 are moved in across the working chamber by hand, and, after the motor has been started, the abutment sections must be moved back into their pockets 52, and remain there during the normal operation of the motor. This outward movement may be effected automatically by levers 53, so mounted that their inner ends extend into the cam groove in drums 22, while their outer ends engage slots 54 in the stems 51 of the abutments. These slots are so located on the stems and of such a length that, when the abutment sections are entirely withdrawn from the working chamber, the oscillation of the levers 53 will not affect the abutment sections, but when the latter have been moved in by hand as stated, the next outward movement of the levers will withdraw the abutment sections into the pockets. After the abutment sections have been moved in, explosive mixture is introduced into the cylinder on one side or the other of the wall or abutment, dependent on the direction in which the motor is to be operated. A convenient means for introducing such explosive mixture consists of a pipe or passage 55, extending from the compression chambers 33 and 34 connected by branches or ports 56 and 57 with the working chamber on opposite sides of the abutment 48, as shown in Fig. 1. The direction of flow of the explosive is controlled by a three-way valve 58, preferably connected to the reversing lever of the motor. In the branches or ports 56 and 57 check valves 59 and 60 are arranged, so as to open with the flow of explosive mixture into the cylinder. Adjacent to the compression chambers, controlling valves 61 and 62 are arranged. These valves are designed to be opened by hand to start the motor, but are preferably closed automatically by outwardly projecting studs 63 and 64 engaged by arms 46 and 45ᵃ on the stems of the valves which control the flow of gas from and to chambers 33 and 34, so that, as soon as the motor begins to operate normally, the controlling valve previously opened by hand will be closed.

In describing the operation of the motor, it will be supposed to be rotating in the direction of the arrow $c$ (Fig. 1). The head 1 is being moved by the pressure of gases in the chamber section A rearward of head 1 and between it and abutment 11. In its forward movement head 1 is compressing a charge of explosive gas previously supplied through an inlet port 24ᵃ (opposite the port 26ᵃ shown in Fig. 1—see Fig. 8) and forcing the same past valve 38 into chamber 33. At the same time, the head 1ᵃ, in moving through chamber section B is pushing the burned gases of a previous explosion out through exhaust port 25ᵃ, the valve controlling that port having been opened when abutment 10 has closed behind the advancing head 1ᵃ. At the same time, the head 1ᵃ is drawing a fresh charge through port 24, into the portion of chamber B rearward of the advancing head 1ᵃ. When the heads 1 and 1ᵃ have reached the position shown in Fig. 1, the abutment sections 10 and 11 are drawn back into their pockets, permitting the heads 1 and 1ᵃ to pass into chamber sections B and A respectively. When the head 1 reaches the position shown in dotted lines (Fig. 1), valve 38ᵃ is lifted by the conjoint operation of the cam 42 and rod 40, the compressed gases rush from chamber 33 into the space in the rear of the head 1 and between the latter and the abutment 10, the sections of which are closed together immediately after the passage of the head 1 between them. An igniter 65, of the electric or any other suitable type, is arranged preferably in the port leading from the compression chamber 33 to the working chamber B, and it now operates to ignite the gases as they flow into the working chamber from the compressing chamber 33. While being driven through chamber B by the expansion of the charge behind it, the head 1 will compress the charge of explosive gases previously drawn into chamber section B by the head 1ᵃ and drive such compressed gases into the compressing chamber 34, from which it will flow again into the working chamber A behind the head 1 and be ignited, when the latter has passed beyond the abutment 11. While the head 1 is being thus driven through chamber section B and in its movement compressing a new charge, the head 1ᵃ is being moved through chamber A, forcing burned gases ahead of it and out of the exhaust port 25, and drawing in a fresh charge through inlet port 24ᵃ.

It will be observed that the head 1ᵃ, operates to scavenge each chamber and to draw a fresh charge thereinto, and that the other head 1 serves, while being driven by an ignited charge, to compress a newly drawn charge and force it into a compressing chamber, from which that charge will be delivered behind the head 1, when it has entered the next chamber. It will be observed that the compression chambers serve as a transfer means, to receive a charge from in front of the head 1, and to deliver it into the working chamber, in the rear of the head 11, after the latter has passed an abutment.

For operating the motor in a reverse direction, a duplicate set of inlet ports 23, 23ᵃ and a duplicate set of exhaust ports 26, 26ᵃ are provided. In reversing, the tappets 43 and 44 are shifted, so as to engage and shift at the proper times the valves 38 and 39, the valves 38ᵃ and 39ᵃ operating when the motor is reversed as check valves, permitting fresh charges to flow from chambers B and A into compressing chambers 33 and 34 respectively. At the same time, the swinging members $a$ of the systems of levers 29 and 30 (see Fig. 3) are shifted, so as to operate exhaust valves 28ᵃ and 28. Suitable provision is made for the simultaneous shifting of the tappets and the swinging members $a$, as for example in Fig. 3, a rod 66 is provided with a finger 67 in engagement with tappet 44 and also to one arm of a bell-crank lever 68, which has its other arm connected to a rod 69 extending to a similar bell crank 70, connected in turn to a finger 71 which engages the tappet 43. The rod 69 may be so connected that, when shifted, it will change the positions not only of tappets 44 and 43, but also of the movable members $a$ of the lever systems employed for operating the exhaust valves. The valve 58 of the starting mechanism may also be connected by suitable means such as shown in Fig. 3 to the rod 69, so that said valve will be reversed at the time the operating mechanisms of the other valves are shifted.

It will readily be understood by those skilled in the art that, in a motor having one head and one abutment, a propelling explosion can be had on every other revolution. By employing two abutments and one head one explosion every revolution can be had. When using two heads and two abutments (as in the drawings) two explosions per revolution will be obtained. In Fig. 6 is shown a motor having four dividing abutments, all operative in proper succession by cams 22 on the main shaft. As Fig. 6 shows only one side of the motor, it will be understood that the mechanism shown, consisting of the cam 22 and levers 19, 19ᵃ, 20, 20ᵃ for operating the abutment sections, will be duplicated on the opposite side. Compression chambers 33ᵃ and 34ᵃ and valve mechanisms controlling the flow of explosive mixture to and from the additional compression chambers are also provided. In this construction, the means employed for shifting the tappets on the valve-shifting rods 40, 40ᵃ, 41, and 41ᵃ to reverse the motor, consist of a movable ring 72 provided with fingers 73 engaging the several tappets. The movable members a of the mechanism controlling the exhaust valves are also connected to a similar ring joined by radial arms 74 to ring 73, so that the mechanisms for both series of valves will be operated simultaneously. When using four abutments and two heads, four explosions per revolution will be obtained, and by using four heads and four abutments eight explosions per revolution can be had.

I claim herein as my invention:

1. In a rotary motor, the combination of an annular chamber, a head movable along said chamber and connected to a concentric rotating shaft, an abutment movable to and from a position in which it forms a transverse wall across said annular chamber, a compression chamber into which gas is compressed by the movement of said head toward said abutment, a port leading from said compression chamber to said annular chamber, a valve controlling said port, and an operating arm driven by the rotation of said shaft and in its movement shifting said valve to alternate open and closed positions, substantially as described.

2. In a rotary motor, the combination of an annular chamber, a head movable along said chamber and connected to a concentric rotary shaft, an abutment movable to and from a position in which it forms a transverse wall across said annular chamber, and a compression chamber adjacent to said abutment and disposed partly on each side thereof, said compression chamber provided with direct communication to each side of said abutment through the walls of the said annular chamber, said head in its rotation toward said compression chamber adapted to compress to an operative pressure ignitible gas in said compression chamber.

3. In a rotary motor, the combination of an annular chamber, a head movable along said chamber and connected to a concentric rotary shaft, a pair of abutments movable by the rotation of said shaft to open and close across said annular chamber at diametrically opposite points, a third abutment movable manually to close across said annular chamber at a point intermediate the pair of abutments first named, and a port for propelling fluid opening into said annular chamber at one side of said manually movable abutment, substantially as described.

4. In a rotary motor the combination of an annular chamber, a head movable along said chamber and connected to a concentric rotary shaft, an abutment movable to and from position in which it forms a transverse wall across said annular chamber, a compression chamber into which gas is compressed by the movement of said head toward said abutment, and means for directing the explosive gas to either side of said head, substantially as described.

5. In a rotary motor the combination of an annular chamber, a head movable along said chamber and connected to a concentric rotary shaft, an abutment movable to and from position in which it forms a transverse wall across said annular chamber, a compression chamber into which gas is compressed by the movement of said head toward said abutment, said compression chamber being placed adjacent to said abutment and provided with valve-controlled ports communicating with said annular chamber on each side of said abutment and means for reversing the action of the valves within said ports, substantially as described.

6. In a rotary motor the combination of an annular chamber, a head movable along said chamber and connected to a concentric rotary shaft, an abutment movable to and from position in which it forms a transverse wall across said annular chamber, a compression chamber into which gas is compressed by the movement of said head toward said abutment, said annular chamber being provided with ports on each side of said abutment, and means for introducing the explosive gas on either side of said abutment, substantially as described.

In testimony whereof, I have hereunto set my hand.

JOSEPH McCONNELL.

Witnesses:
JAS. W. DRAPE,
FRANCIS J. TOMASSON.